Sept. 6, 1932.  A. W. KEUFFEL  1,875,927
SLIDE RULE
Filed Oct. 29, 1930

Inventor
ADOLF W. KEUFFEL
By his Attorneys
Bohleber + Ledbetter

Patented Sept. 6, 1932

1,875,927

UNITED STATES PATENT OFFICE

ADOLF W. KEUFFEL, OF MONTCLAIR, NEW JERSEY, ASSIGNOR TO KEUFFEL & ESSER CO., OF HOBOKEN, NEW JERSEY, A CORPORATION OF NEW JERSEY

SLIDE RULE

Application filed October 29, 1930. Serial No. 491,856.

This invention relates to slide rules and has for its primary object the retention of the component parts against unintentional displacement. In one of its aspects, the invention seeks to provide a slide rule in which the runner is not likely to become displaced and pushed entirely off the rule, as, for example, when the slide rule is carried in the pocket, without a case. Another object of the invention is the provision of a slide rule which is simple and inexpensive to manufacture and one that is reliable in operation and not likely to get out of order.

In accordance with the invention, the inherent resiliency of the slide rule itself is relied upon to retain the slide in place. Portions on the rule are utilized to prevent unintentional removal of the runner.

These and other objects of the invention and the means for their attainment will be more apparent from the following detailed description, taken in connection with the accompanying drawing, illustrating one embodiment by which the invention may be realized, and in which:—

Figure 1:
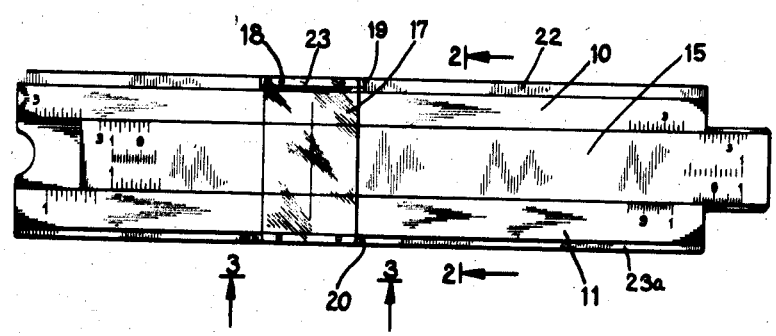
Figure 1 is a view showing the slide rule of this invention, in plan.
Figure 2:
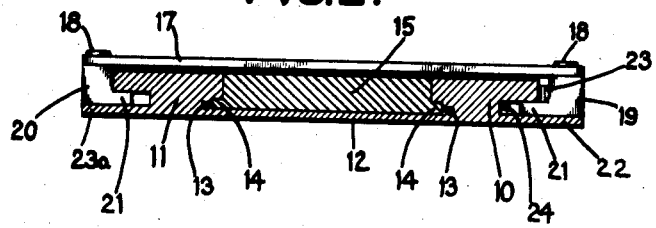
Figure 2 is a vertical transverse section, taken on the line 2—2 of Figure 1.
Figure 3:
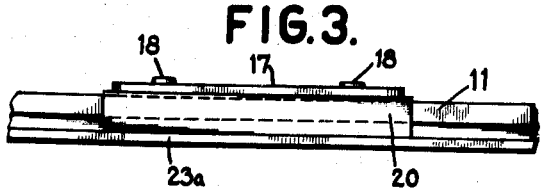
Figure 3 is a view showing the runner and a fragmentary portion of the slide rule in side elevation.

Referring to the drawing, the slide rule comprises, generally, a pair of side bars 10, 11 carried with a base 12 shown as of relatively thin sheet-like form. If desired, the slide rule may be formed from a single piece of material, such as pyroxylin, molded or otherwise formed with the thin sheet-like base 12 having integral therewith the pair of side bars 10, 11, which may be generally T-shaped in cross-section, and extend in parallel relationship longitudinally, one at each side of the connecting base portion 12. Inwardly the respective undercut portions of the side bars 10, 11 provide opposed grooves 13, which receive flanges 14 on the slide 15. The slide 15 and side bars 10, 11 are, of course, provided with scales, fragmentary portions of which are shown on their upper surfaces in Figure 1, but which scales form no part of the present invention.

It will be seen that the two side bars 10, 11, together, provide a guideway for the slide 15. When the base 12, whether integral with the bars 10, 11 or separate therefrom and secured thereto, is made of relatively thin pyroxylin, as already described, its inherent resiliency causes the side bars 10, 11 to yieldingly grip the slide 15 so that the slide is held in place by this natural spring action without the addition of special parts provided for that purpose although the slide is freely movable under pressure when the slide rule is manipulated in use.

The runner, as shown, comprises a sheet or plate 17 of transparent material, such as glass or pyroxylin or the equivalent, which extends across the face of the slide rule and is secured at its sides, as by means of suitable rivets 18 or the like, to the guides 19, 20 of the runner. The guides 19, 20 are shown as provided with inwardly extending flanges 21, integral therewith and adapted to move in and be guided by grooves 24 formed in the outer side surfaces of the respective side bars 10, 11.

Between the one guide 19 and the side bar 10 there is shown a spring 23 which presses the guide 19 and the bar 10 apart and consequently holds the surface of the other guide 20 snugly against the other bar 11, as is customary in slide rules.

Where the guides of the runner of a slide rule are disposed outwardly of the outer marginal surfaces of the side bars, as indeed they are in all existing slide rules, such a slide rule cannot be conveniently carried in the pocket without a protecting casing, as otherwise the material of the pocket will tend to catch the runner and hold it back in the pocket when the slide rule is withdrawn therefrom. To overcome this disadvantage, it will be seen that the bars 10, 11 are formed, respectively, with portions 22, 23a, which extend preferably a slight distance beyond the bars and flush with or slightly beyond the outer marginal surfaces of the guides 19, 20, forming thereby protecting shields or guards here shown as flanges 22 and 23a. Because of the spring 23 and the extra space required by this spring, the shield 22 may, if desired, extend a greater distance from the bar 10 than does the corresponding shield 23a from the bar 11. It will be readily understood that the tendency for the runner to become displaced by accidental means, such for example as the friction of the clothing when the slide rule is placed in or withdrawn from the pocket, is very greatly reduced by means of the protecting shields or flanges 22 and 23a. The greater convenience achieved by thus dispensing with a carrying case for the slide rule as well as the reduction in cost is considerable and at the same time a form of rule has been devised which is simple in construction and inexpensive to manufacture.

It will be obvious that the bars 10 and 11 may be integral with or separate from the base plate 12 and secured thereto and that the protecting shields or flanges 22 and 23a may be separate from or integral with the bars or they may be integral with or continuations of the base plate 12 to which T-shaped bars may be attached.

Various modifications will occur to those skilled in the art in the composition, configuration and disposition of the component elements going to make up the invention as a whole, as well as in the selection and/or combination of the respective elements, as also is the use of certain features independently of others and no limitation is intended by the phraseology of the foregoing specification or illustrations in the accompanying drawing, except as indicated in the appended claims.

What is claimed is:—

1. In a slide rule, in combination, a pair of spaced side bars, a slide movable therebetween, said side bars being formed, in their outer sides, respectively, with longitudinally extending grooves, substantially rectangular in cross-section, a runner comprising guide portions disposed one on each side of the rule, each guide being formed with a tongue to be received in and slidable in the grooves, the bottom surface of the flange lying in the plane of the bottom surface of the guide portions and the bottom wall of the groove extending outwardly in one plane to a point at least in the plane of the outer marginal surface of the guide portions.

2. In a slide rule, in combination, a pair of spaced side bar members, a slide movable therebetween, a runner comprising guide portions disposed one on each side of the rule, tongue and groove connections between the runner and the slide rule whereby said runner is slidable longitudinally of the rule, protective members carried with the side bar members on their outer sides and along their entire length, the surfaces of said protective members proximate said guide portions lying so closely adjacent to the lower surfaces of said guide portions that there is substantially no space therebetween and extending outwardly to a line at least in the plane of the outer marginal surface of the guide portions.

3. In a slide rule, in combination, a pair of spaced side bar members, a slide movable therebetween, a runner slidable with respect to the side bar members and comprising guide portions disposed one on each side of the side bar members, said side bar members having, respectively, surfaces lying substantially parallel to lower adjacent surfaces of the guide portions and so close thereto that there is substantially no space therebetween, said surfaces on the side bar members extending outwardly to a line at least in the plane of the outer marginal surface of the guide portions.

In testimony whereof I affix my signature.

ADOLF W. KEUFFEL.